Nov. 17, 1959　　　S. KUBA　　　2,912,950
BRAZING APPARATUS
Filed July 30, 1953　　　　　　　3 Sheets-Sheet 3
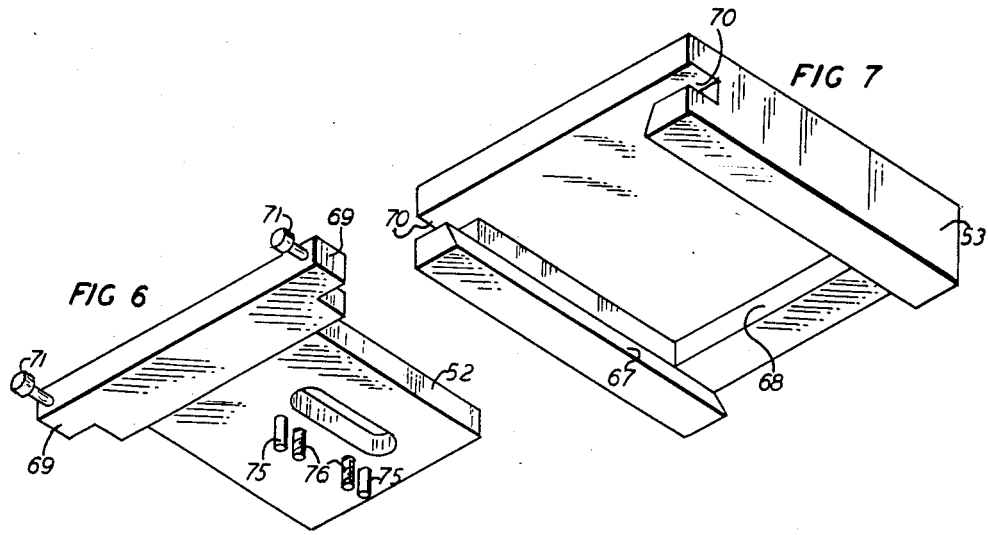
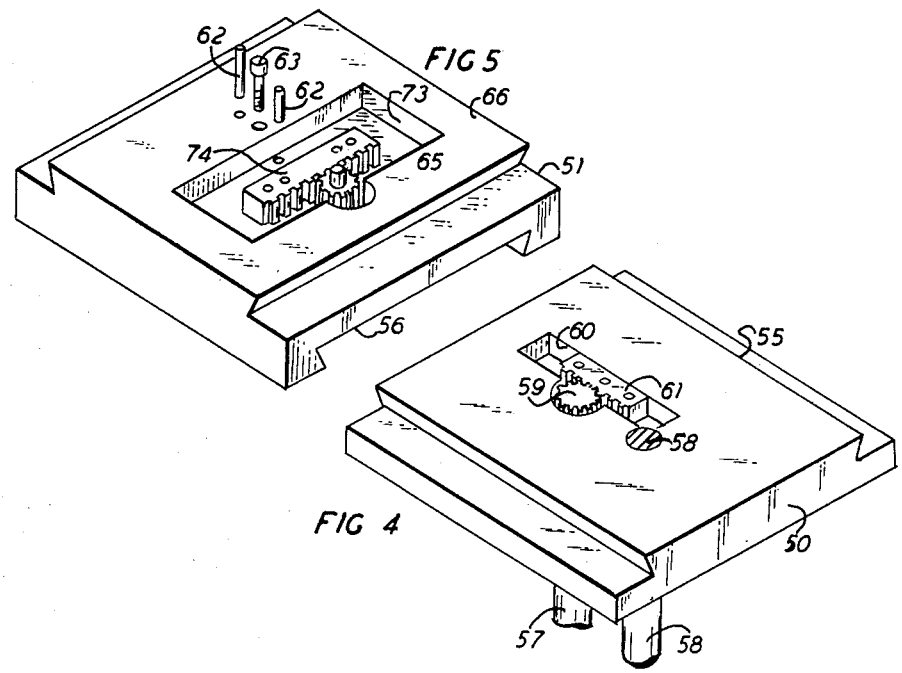
INVENTOR
SAMUEL KUBA
BY
ATTORNEY

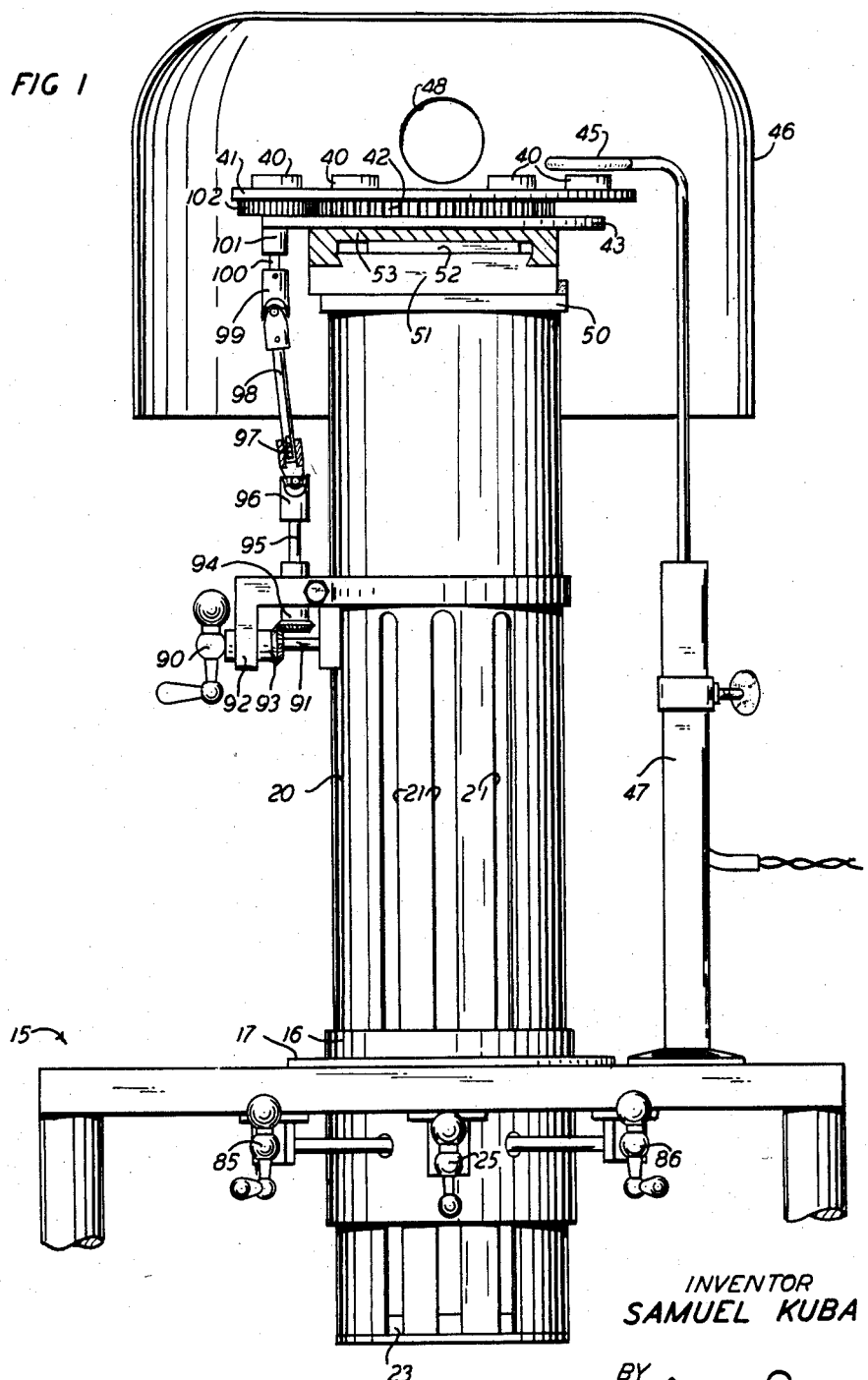

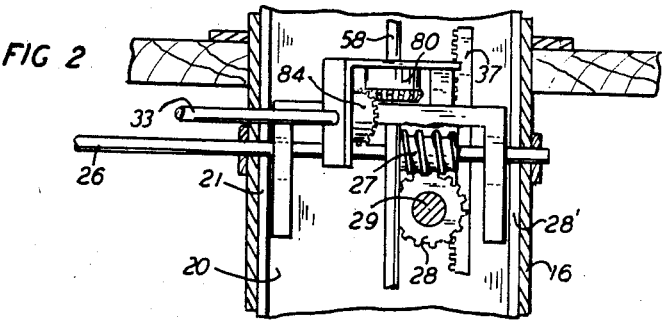
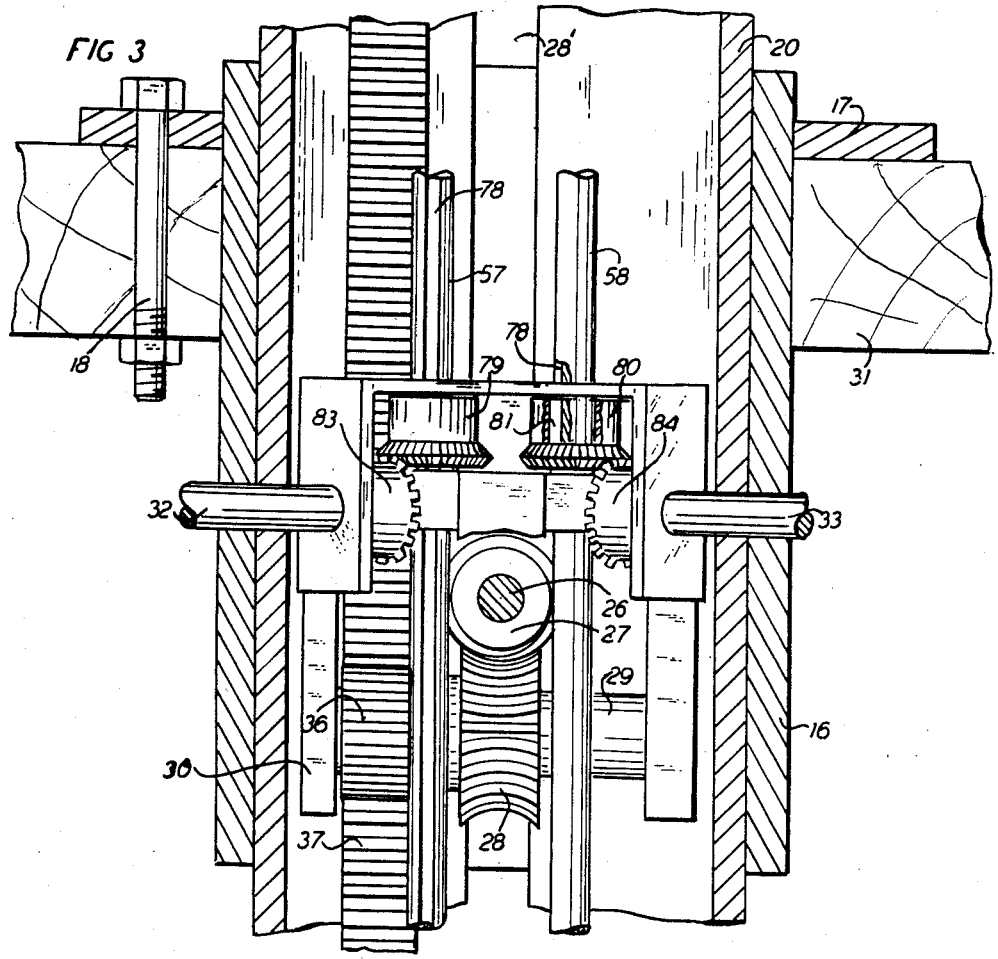

United States Patent Office 2,912,950
Patented Nov. 17, 1959

2,912,950

BRAZING APPARATUS

Samuel Kuba, Allentown, Pa., assignor to Western Electric Company, Incorporated, New York, N.Y., a corporation of New York Application July 30, 1953, Serial No. 371,373

2 Claims. (Cl. 113—59)

This invention relates to article treating apparatus and more particularly to apparatus for inductively heating metal articles.

In the present embodiment of the invention the treatment of the articles is known as high frequency brazing wherein two or more metal articles are brazed together after being heated inductively by a high frequency coil. It has been found that this operation may be performed more satisfactorily with the use of a flushing agent such as hydrogen in the brazing area. To do this efficiently, an enclosure must be provided for the brazing area thus presenting problems of moving the articles into and out of the enclosure and positioning them accurately relative to the high frequency coil.

The object of the invention is an apparatus which, although simple in structure, is highly efficient in accurately positioning articles relative to a treating unit.

With this and other objects in view, the invention comprises an article treating apparatus wherein a treating unit is mounted at a fixed position and an element, adapted to hold an article, is supported and moved vertically and laterally to position the article adjacent the treating unit.

In the present embodiment of the invention, the treating unit is disposed in a hood, while the element, to support a plurality of articles, is movable vertically from a loading position to a treating position adjacent the treating unit, other means being provided to move the element in different directions laterally to locate the article successively adjacent the testing unit while another means provides a flexible-like connection with the element to rotate the element to bring the articles successively into registration with the treating unit.

Other objects and advantages will be apparent from the following detailed description when considered in conjunction with the accompanying drawings wherein:

Fig. 1 is a front elevational view of the apparatus, portions thereof being shown in section;

Fig. 2 is a fragmentary sectional view illustrating portions of the moving means;

Fig. 3 is an enlarged fragmentary vertical sectional view of the means shown in Fig. 2 but taken at right-angles with respect thereto, and Figs. 4, 5, 6 and 7 are isometric views of members interposed between the main support and the element on which the articles are disposed for treatment.

Referring now to the drawings, attention is first directed to Fig. 1 which illustrates a frame-like structure 15 having an aperture in the horizontal portion thereof to receive a sleeve 16 which has an annular flange 17 fixed thereto and connected to the frame 15 by suitable means such as bolts 18.

The sleeve 16 has a tubular support 20 disposed therein, the outer diameter of the tubular member 20 being substantially equal to the inner diameter of the sleeve 16, whereby the support 20 is free to move vertically only in a fixed path. The tubular support 20 has three closely positioned vertically extending slots 21 extending a given distance from the bottom of the support which is closed by a member 23.

The means to move the support 20 vertically originates with a hand-crank 25 which is mounted on a shaft 26, shown in Figs. 2 and 3, the shaft being journalled in suitable bearings and having a worm 27 mounted thereon within the tubular support 20. Attention is directed to Fig. 2 which illustrates a vertically extending slot 28' in the support 20 for the shaft 26, this slot being diametrically opposed the center one of the three slots 21. The worm 27 interengages a worm gear 28 which is mounted on a shaft 29 journalled in suitable bearings 30 of a supporting frame 31 disposed within the tubular support and supported mainly by the shaft 26 and other adjusting shafts 32 and 33. A pinion 36, mounted on the shaft 29, is rotated thereby to cause vertical movement of a rack 37. The rack 37 is fixedly mounted in any suitable manner (not shown) to the tubular support 20 so that during rotation of the hand-crank 25 to rotate the shaft 26, the worm 27, the worm gear 28, the shaft 29 and the pinion 36, the rack with the tubular support will be raised or lowered.

In the present embodiment of the invention, articles 40, to be brazed or otherwise treated, are to be supported by an element or table 41 mounted on a gear 42 which is supported in a suitable manner for rotation about its axis on a plate-like member 43. The treating unit, in the present embodiment of the invention, is a high frequency coil 45 disposed at a given position in a hood 46 and supported by a bracket 47. The hood 46, supported by any suitable means not shown, is provided with an inlet 48 which may be connected to a suitable supply of flushing material such as hydrogen.

The means to provide lateral adjustment of the element 41 in different directions with respect to the coil 45 includes the series of members 50, 51, 52 and 53 (shown in Figs. 4 to 7 inclusive) interposed between the top of the tubular support 20 and the element 41, particularly the plate 43. The member 50, fixedly mounted directly on the support 20, includes a dove-tailed portion 55 for interengagement with a dove-tailed groove 56 in the member 51. The member 50 is also apertured to receive vertically extending shafts 57 and 58, the shaft 57 terminating in a pinion 59 while the shaft 58 continues through the member 50 and the member 51. The pinion 59 partially enters a recess 60 in the member 50 to receive a rack 61 which interengages the pinion. The rack 61 is fixed to the undersurface of the member 51 in the dove-tailed groove 56 by the aid of pins 62 and a screw 63. Through this connection, rotation of the shaft 57 to rotate its pinion 59 will move the rack 61 in its groove 60 to move the member 51 in either direction relative to the member 50.

A similar arrangement is provided between the shaft 58 and a pinion 65 mounted on its upper end to cause movement of the member 52 and also the member 53 relative to the member 51. The member 51 has a dove-tailed portion 66 for interengagement with a dove-tailed groove 67 provided in the member 53 when the member 52 is mounted in place, lying in a recess 68 and having its projections 69 disposed in recesses 70 where the member 52 is secured in place by the aid of screws 71. It will be noted that the member 51 is recessed at 73 to receive the rack 74 for interengagement with the pinion 65, the rack being secured to the member 52 by the aid of pins 75 and screws 76.

The shafts 57 and 58 have longitudinally extending keyways 78 to receive keys carried by bevelled gears 79 and 80, such as the key 81 shown in the bevelled gear 80. The bevelled gears 79 and 80 are supported in the inner frame 31 and interengage bevelled gears 83 and 84 which are mounted on the shafts 32 and 33 respectively. Hand-cranks 85 and 86 are mounted on the outer ends of the shafts 32 and 33. This completes the mechanisms for laterally adjusting the element 41 in different directions. Due to these lateral adjustments, the means for rotating the element 41 must be, of necessity, of a flexible nature so that the element may be rotated regardless of its lateral adjustment. The driving means for the table originates with a hand-crank 90 mounted on a shaft 91 which is suitably journalled in a bracket 92 mounted on the tubular support 20. A bevelled gear 93 fixedly mounted on the shaft 91 interengages a bevelled gear 94 of a shaft 95. A flexible coupling 96 is mounted on the upper end of the shaft 95 and is provided with an expansible connection, through a pin and longitudinal aperture 97, with a shaft 98. Another flexible coupling 99 connects the shaft 98 with a shaft 100 which is journalled in a suitable bearing 101 supported by the plate-like member 43 and having a pinion 102 mounted on its upper end and interengaging the gear 42.

Considering now the operation of the apparatus, let it be understood that the element 41, for supporting the articles for treatment, may be moved from a loading position below the hood to the treating position (shown in Fig. 1) adjacent the unit or coil 41 in the hood. Assume, for example, that the element 41 is in the loading position and that the articles 40 have been disposed at the desired positions on the element. Suitable means (not shown) may be mounted on the element to assist in locating the articles at fixed equally spaced positions about the element. When the element is loaded with articles to be treated, the hand-crank 25 may be actuated to drive the mechanism associated therewith including the pinion 36 to move the rack 37 vertically with the support 20 until the element is in a given plane with respect to the coil 45. If desired, the hood 46 may be of transparent material so that after elevation of the element to its desired plane, the other hand-cranks 85 and 86 may be operated singly or simultaneously, to move the element with the articles in different directions laterally, to accurately locate one of the elements with respect to the coil, after which it will be known that the other elements will be accurately located when brought into position. These lateral adjustments are not affected by the rotating means for the element, nor do these lateral adjustments affect the rotating means for the element. The element 41 may be rotated by rotating the hand-crank in either direction.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A brazing apparatus which comprises a hood, article heating means fixedly positioned within the hood, an article supporting table, adjusting means connected to the table for horizontally orienting the table with respect to the heating means, means outside the hood linked to the adjusting means for operating the latter means within the hood, support means coupled to the adjusting means for vertically positioning the table with respect to the article heating means within the hood, and means outside the hood linked to the support means for vertically reciprocating the latter means.

2. A brazing apparatus which comprises a hood, article heating means fixedly positioned within the hood, an article supporting table, drive means connected to the table for rotating the table and exposing articles on the table serially to the heating means, means outside the hood coupled to the drive means for operating the latter means within the hood, adjusting means connected to the table for horizontally orienting the table with respect to the heating means, means outside the hood linked to the adjusting means for operating the adjusting means within the hood, support means coupled to the adjusting means for vertically positioning the table with respect to the article heating means within the hood, and means outside the hood linked to the support means for vertically reciprocating the support means.

References Cited in the file of this patent

UNITED STATES PATENTS

| | | |
|---|---|---|
| 2,289,874 | Curtis | July 14, 1942 |
| 2,390,596 | Larsen | Dec. 11, 1945 |
| 2,393,484 | Somes | Jan. 22, 1946 |
| 2,449,089 | Somes | Sept. 14, 1948 |
| 2,469,920 | Henkel | May 20, 1949 |
| 2,496,950 | Marcus et al. | Feb. 7, 1950 |
| 2,511,059 | Haynes | June 13, 1950 |
| 2,533,919 | Christiansen et al. | Dec. 12, 1950 |
| 2,539,506 | Bura | Jan. 30, 1951 |
| 2,603,178 | Cahenzli et al. | July 15, 1952 |
| 2,654,822 | Agule | Oct. 6, 1953 |
| 2,405,828 | Huguley | Aug. 13, 1956 |